(12) United States Patent
Hart et al.

(10) Patent No.: US 11,822,994 B2
(45) Date of Patent: *Nov. 21, 2023

(54) SYSTEMS AND METHODS FOR CONTROLLING SECURED DATA TRANSFER VIA URLS

(71) Applicant: Capital One Services, LLC, McLean, VA (US)

(72) Inventors: Colin Hart, Washington, DC (US);
Jeffrey Rule, Chevy Chase, MD (US);
Kaitlin Newman, Washington, DC (US); Lea Cody, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,761

(22) Filed: Nov. 24, 2021

(65) Prior Publication Data

US 2022/0121828 A1 Apr. 21, 2022

Related U.S. Application Data

(63) Continuation of application No. 16/985,973, filed on Aug. 5, 2020, now Pat. No. 11,216,623.

(51) Int. Cl.
*G06K 7/08* (2006.01)
*G06F 16/955* (2019.01)
*H04L 67/01* (2022.01)

(52) U.S. Cl.
CPC ......... *G06K 7/087* (2013.01); *G06F 16/9566* (2019.01); *H04L 67/01* (2022.05)

(58) Field of Classification Search
CPC ....... G06K 7/08–7/089; G06F 16/90–16/9566; H04L 67/42; H04L 65/00–65/80
See application file for complete search history.

(56) References Cited

U.S. PATENT DOCUMENTS

| | | | |
|---|---|---|---|
| 6,058,373 A | 5/2000 | Blinn et al. | |
| 6,199,762 B1 | 3/2001 | Hohle | |
| 6,342,844 B1 | 1/2002 | Rozin | |
| 6,549,912 B1* | 4/2003 | Chen ................ | G06Q 20/35765 |
| 6,829,711 B1 | 12/2004 | Kwok et al. | |

(Continued)

OTHER PUBLICATIONS

Notification Concerning Transmittal of International Preliminary Report on Patentability from related PCT Application No. PCT/US2021/044251, dated Feb. 16, 2023.

*Primary Examiner* — Clayton R Williams
(74) *Attorney, Agent, or Firm* — HUNTON ANDREWS KURTH LLP

(57) ABSTRACT

An authenticated data sharing system may include a contactless card comprising a processor and a memory including one or more applets and an application comprising instructions for execution on a device. The application is configured to determine a capability associated with the contactless card after a first entry into a communication field. The application is configured to request additional information based on the determination. The one or more applets are configured to transmit, to the application, a generated tokenized link after a second entry into the communication field based on the requested additional information. The application is configured to transmit the link to obtain the requested additional information.

20 Claims, 7 Drawing Sheets

(56) References Cited

U.S. PATENT DOCUMENTS

| | | |
|---|---|---|
| 6,834,271 B1 | 12/2004 | Hodgson et al. |
| 6,877,656 B1 | 4/2005 | Jaros et al. |
| 7,128,274 B2 | 10/2006 | Kelley et al. |
| 7,165,727 B2 | 1/2007 | de Jong |
| 7,232,073 B1 | 6/2007 | de Jong |
| 7,246,752 B2 | 7/2007 | Brown |
| 7,319,986 B2 | 1/2008 | Praisner et al. |
| 7,374,099 B2 | 5/2008 | de Jong |
| 7,584,153 B2 | 9/2009 | Brown et al. |
| 7,793,851 B2 | 9/2010 | Mullen |
| 7,922,082 B2 | 4/2011 | Muscato |
| 8,196,131 B1 | 6/2012 | von Behren et al. |
| 8,302,872 B2 | 11/2012 | Mullen |
| 8,332,272 B2 | 12/2012 | Fisher |
| 8,365,988 B1 | 2/2013 | Medina et al. |
| 8,567,670 B2 | 10/2013 | Stanfield et al. |
| 8,615,468 B2 | 12/2013 | Varadarajan |
| 8,750,514 B2 | 6/2014 | Gallo et al. |
| 10,467,622 B1 | 11/2019 | Rule et al. |
| 2001/0029485 A1 | 10/2001 | Brody et al. |
| 2001/0034702 A1 | 10/2001 | Mockett et al. |
| 2001/0037254 A1 | 11/2001 | Glikman |
| 2002/0120583 A1 | 8/2002 | Keresman et al. |
| 2002/0152116 A1 | 10/2002 | Yan et al. |
| 2002/0153424 A1 | 10/2002 | Li |
| 2006/0043164 A1* | 3/2006 | Dowling ............... H04M 1/675 235/375 |
| 2006/0136334 A1 | 6/2006 | Atkinson et al. |
| 2006/0173985 A1 | 8/2006 | Moore |
| 2007/0061266 A1 | 3/2007 | Moore et al. |
| 2007/0061487 A1 | 3/2007 | Moore et al. |
| 2008/0035738 A1 | 2/2008 | Mullen |
| 2008/0071681 A1 | 3/2008 | Khalid |
| 2008/0308641 A1 | 12/2008 | Finn |
| 2010/0023455 A1 | 1/2010 | Dispensa et al. |
| 2011/0101093 A1 | 5/2011 | Ehrensvard |
| 2011/0153437 A1 | 6/2011 | Archer et al. |
| 2011/0184820 A1 | 7/2011 | Mon et al. |
| 2011/0276419 A1 | 11/2011 | Johnson et al. |
| 2012/0006891 A1 | 1/2012 | Zhou et al. |
| 2012/0178366 A1 | 7/2012 | Evy et al. |
| 2012/0203572 A1 | 8/2012 | Christensen |
| 2012/0207305 A1 | 8/2012 | Gallo et al. |
| 2012/0239567 A1* | 9/2012 | Choi ................... G06Q 20/1085 705/41 |
| 2013/0018715 A1 | 1/2013 | Zhou et al. |
| 2013/0104251 A1 | 4/2013 | Moore et al. |
| 2013/0132234 A1 | 5/2013 | Grossi et al. |
| 2013/0138516 A1 | 5/2013 | White |
| 2013/0171929 A1 | 7/2013 | Adams et al. |
| 2013/0219466 A1* | 8/2013 | Menon .................. H04L 63/102 726/3 |
| 2014/0214674 A1 | 7/2014 | Narula |
| 2014/0244409 A1 | 8/2014 | Nathanel et al. |
| 2014/0252090 A1 | 9/2014 | Bostwick |
| 2014/0279106 A1 | 9/2014 | Smelcer |
| 2014/0357187 A1* | 12/2014 | Ehrensvard .......... H04B 5/0031 455/41.1 |
| 2015/0244706 A1* | 8/2015 | Grajek ................ H04L 63/0815 726/6 |
| 2015/0278843 A1 | 10/2015 | Lawe et al. |
| 2015/0348004 A1 | 12/2015 | Eramian |
| 2016/0012465 A1 | 1/2016 | Sharp |
| 2016/0048913 A1 | 2/2016 | Rausaria et al. |
| 2016/0300224 A1* | 10/2016 | Liu .................. G06K 19/06112 |
| 2016/0307082 A1* | 10/2016 | Wurmfeld ........ G06K 19/07707 |
| 2016/0335531 A1 | 11/2016 | Mullen et al. |
| 2017/0004502 A1 | 1/2017 | Quentin et al. |
| 2017/0011395 A1 | 1/2017 | Pillai et al. |
| 2017/0024716 A1 | 1/2017 | Jiam et al. |
| 2017/0039566 A1 | 2/2017 | Schipperheijn |
| 2017/0068950 A1 | 3/2017 | Kwon |
| 2017/0103388 A1* | 4/2017 | Pillai ................. G06Q 20/3829 |
| 2017/0116447 A1 | 4/2017 | Cimino et al. |
| 2017/0140379 A1 | 5/2017 | Deck |
| 2017/0161717 A1 | 6/2017 | Xing et al. |
| 2017/0330173 A1 | 11/2017 | Woo et al. |
| 2018/0039986 A1 | 2/2018 | Essebag et al. |
| 2018/0068316 A1 | 3/2018 | Bsebag et al. |
| 2018/0160255 A1 | 6/2018 | Park |
| 2019/0014107 A1 | 1/2019 | George |
| 2019/0019375 A1 | 1/2019 | Foley |
| 2019/0205244 A1 | 7/2019 | Smith |
| 2019/0363746 A1 | 11/2019 | Zalewski et al. |
| 2020/0019725 A1 | 1/2020 | Rule et al. |
| 2020/0106615 A1 | 4/2020 | Rule et al. |

\* cited by examiner

SYSTEMS AND METHODS FOR CONTROLLING SECURED DATA TRANSFER VIA URLS

CROSS-REFERENCE TO RELATED APPLICATION

This application is a continuation of U.S. patent application Ser. No. 16/985,973, filed Aug. 5, 2020, the complete disclosure of which is incorporated herein by reference in its entirety.

FIELD OF THE DISCLOSURE

The present disclosure relates to systems and methods for controlling secured data transfer via uniform resource locators (URLs).

BACKGROUND

Transactions involving cards, such as smartcards, are very common in the marketplace. However, card-based transactions can be susceptible to security risks, and the need to protect data against inadvertent access and unauthorized access is increasing. In addition, card-based transactions can be restricted to the exchange of only limited amounts of information, which can limit the effectiveness of card-based transactions.

For example, when a user is performing a checkout of an item at a store, the user is often required to pass along additional information related to their purchase. This information could pertain to the purchase, or a means of establishing future communication, or other type of information. Currently, the user must manually provide this information or provide it orally to the cashier, which can result in reduced security and minimal control, access, and permission enforcement of the passage of information. This can also result in decreased efficiency and adverse impacts the overall user experience.

These and other deficiencies exist. Accordingly, there is a need to provide systems and methods that overcome these deficiencies to improve security, efficiency, and the overall user experience for a customizable content sharing and permission system with a reduced risk of data interception, leaking, or unauthorized access.

SUMMARY OF THE DISCLOSURE

Embodiments of the present disclosure provide an authenticated data sharing system, including a contactless card comprising a processor and a memory including one or more applets. The system may comprise an application comprising instructions for execution on a device. The application may be configured to determine a capability associated with the contactless card after a first entry into a communication field. The application may be configured to request additional information based on the determination. The one or more applets may be configured to transmit, to the application, a generated tokenized link after a second entry into the communication field based on the requested additional information. The application may be configured to transmit the link to obtain the requested additional information.

Embodiments of the present disclosure provide a method of authenticating shared data. The method may include determining, by an application comprising instructions for execution on a client device, a capability associated with a contactless card after a first entry by the contactless card into a communication field of the device. The method may include requesting, by the application, additional data. The method may include generating, by the contactless card, a link based on the requested data. The method may include transmitting, after a second entry to the communication field, the link from a contactless card to the application. The method may include transmitting, to a server, the link from the application for accessing the additional data.

Embodiments of the present disclosure provide a computer readable non-transitory medium comprising computer-executable instructions that are executed on a processor and comprising the steps of: determining a capability associated with a contactless card after a first entry by the contactless card into a communication field of a device; requesting additional data based on the determined capability; generating a one-time encrypted link based on the requested additional data; transmitting, after a second entry to the communication field, the one-time encrypted link; and activating the link for accessing the requested additional data.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

An applet of a transmitting device, such as a contactless card, may generate a tokenized, unique uniform resource locator to transmit to another device, such as a point of sales (POS) system, via near field communication (NFC). The POS system may then be used to programmatically look up information granted by a user. The POS system may request certain information about the user that they have entered and approved for sharing. For example, without limitation, the information may comprise insurance information that may be transmitted to a doctor office for calculating an amount the user owes at the time of purchase. In other examples, the information may comprise an email address for a merchant newsletter or discounts. In other examples, the information may comprise shipping information for an item not in stock. The user may control what information is available to recipients or merchants via an application comprising instructions for execution on a device. The user may tap their card to the device to save that preference. Alternatively, the POS system may be configured to allow the user to specify, at the time of purchase, what information may be available to the recipient.

Accordingly, the systems and methods disclosed herein provide for customizable content and permission access thereby improving security over existing implementations. The user may provide information relating to a purchase, transaction, or other activity securely, with a reduced risk of data interception, leaking, or unauthorized access. For example, if the user is completing a transaction in connection with a POS device or other device, the user need not manually enter or orally state the information. In addition, the user experience and efficiency of the purchase can be improved.

Figure 1:
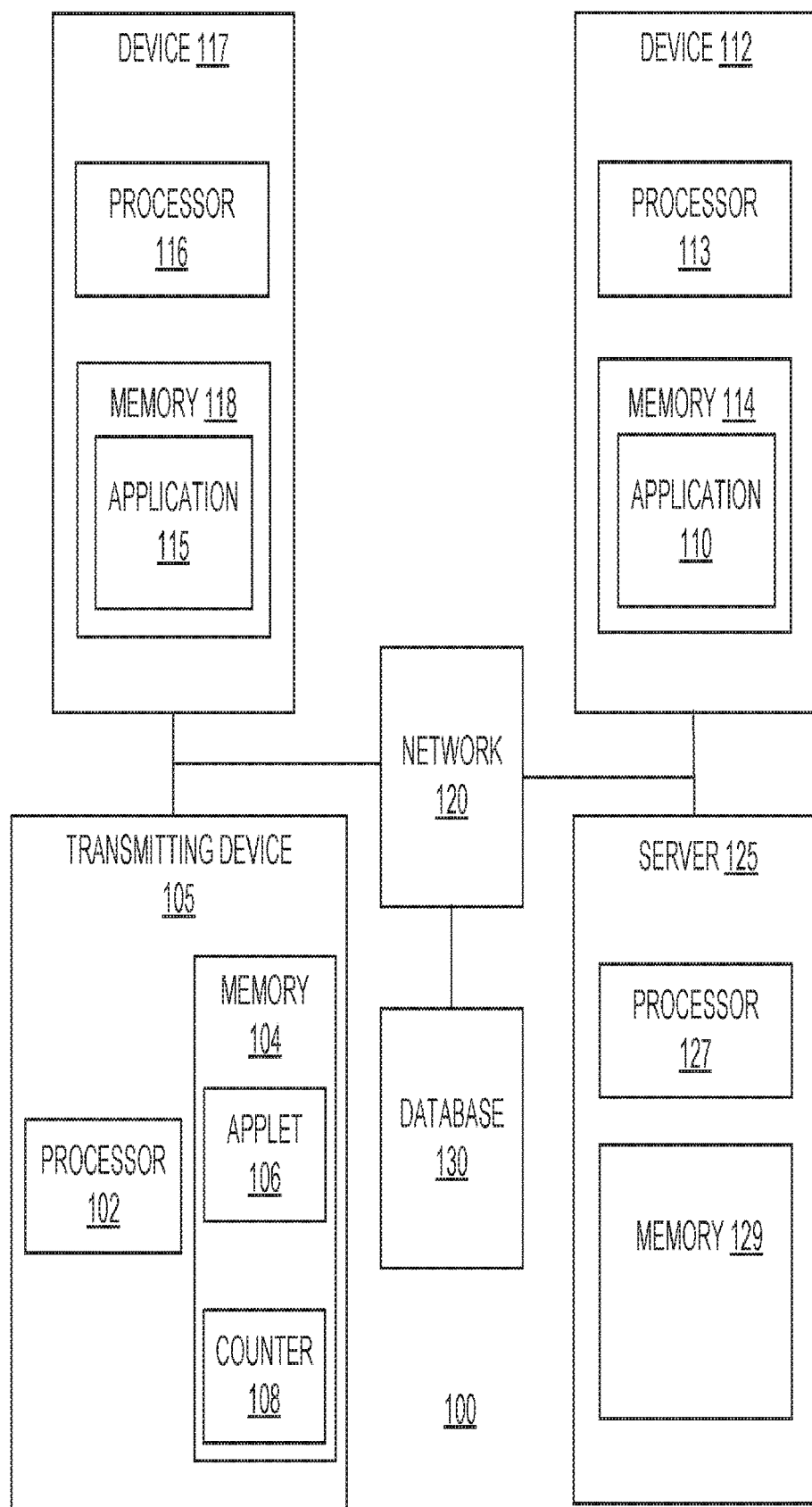
FIG. 1 depicts an authenticated data sharing system according to an exemplary embodiment.

FIG. 1 illustrates an authenticated data transfer system 100 according to an exemplary embodiment. The authenticated data transfer system 100 may comprise a transmitting device 105, a first application 110, a second application 115, a network 120, a server 125, and a database 130. Although FIG. 1 illustrates single instances of components of system 100, system 100 may include any number of components.

System 100 may include a transmitting device 105. The transmitting device 105 may comprise a contactless card, a contact-based card (e.g., a magnetic stripe card or a contact-based chip card), or may be the same or similar to the first device 112. As further explained below in FIGS. 2A-2B, transmitting device 105 may include one or more processors 102, and memory 104. Memory 104 may include one or more applets 106 and one or more counters 108. Transmitting device 105 may be in data communication with one or more devices 112, 117. For example, transmitting device may transmit data via network 120 to client devices 112, 117. In some examples, transmitting device 105 may be configured to transmit data via network 120 to client device 117 after entry into one or more communication fields of client devices 112, 117.

System 100 may include a first application 110. For example, first application 110 may comprise instructions for execution on a first device 112. First application 110 may be in communication with any components of system 100. For example, first device 112 may execute one or more applications, such as first application 110, that enable, for example, network and/or data communications with one or more components of system 100 and transmit and/or receive data. The first device 112 may include one or more processors 113 coupled to memory 114. For example, first device 112 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, a contactless card, a contact-based card, or other device. First device 112 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first device 112 may include processing circuitry and may contain additional components, including processors, memories, error and parity/CRC checkers, data encoders, anticollision algorithms, controllers, command decoders, security primitives and tamperproofing hardware, as necessary to perform the functions described herein. The first device 112 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein. In some examples, the first device 112 may include at least one selected from the group of a mobile device, a wearable device, a point of sales system, a kiosk, and a terminal.

System 100 may include a second application 115. Second application 115 may comprise instructions for execution on a second device 117. Second application 115 may be in communication with any components of system 100. For example, second device 117 may execute one or more applications, such as second application 115, that enable, for example, network and/or data communications with one or more components of system 100 and transmit and/or receive data. The second device 117 may include one or more processors 116 coupled to memory 118. For example, second device 117 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Second device 117 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 117 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 117 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein. In some examples, the second device 117 may include at least one selected from the group of a mobile device, a wearable device, and a kiosk.

System 100 may include a network 120. In some examples, network 120 may be one or more of a wireless network, a wired network or any combination of wireless network and wired network, and may be configured to connect to any one of components of system 100. For example, client devices 112, 117 may be configured to connect to server 125 via network 120. In some examples, network 120 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 120 may include, without limitation, telephone lines, fiber optics, IEEE Ethernet 902.3, a wide area network, a wireless personal area network, a LAN, or a global network such as the Internet. In addition, network 120 may support an Internet network, a wireless communication network, a cellular network, or the like, or any combination thereof. Network 120 may further include one network, or any number of the exemplary types of networks mentioned above, operating as a stand-alone network or in cooperation with each other. Network 120 may utilize one or more protocols of one or more network elements to which they are communicatively coupled. Network 120 may translate to or from other protocols to one or more protocols of network devices. Although network 120 is depicted as a single network, it should be appreciated that according to one or more examples, network 120 may comprise a plurality of interconnected networks, such as, for example, the Internet, a service provider's network, a cable television network, corporate networks, such as credit card association networks, and home networks.

Client devices 112, 117 may be in communication with one or more servers 125 via one or more networks 120, and may operate as a respective front-end to back-end pair with server 125. Client devices 112, 117 may transmit, for example from a mobile device application 110, 115 executing thereon, one or more requests to server 125. The one or more requests may be associated with retrieving data from server 125. Server 125 may receive the one or more requests from client devices 112, 117. Based on the one or more requests from client applications 110, 115, server 125 may be configured to retrieve the requested data. Server 125 may be configured to transmit the received data to client applications 110, 115, the received data being responsive to one or more requests.

System 100 may include one or more servers 125. In some examples, server 125 may include one or more processors 127 coupled to memory 129. Server 125 may be configured as a central system, server or platform to control and call various data at different times to execute a plurality of workflow actions. Server 125 may be configured to connect to one or client devices 112, 117. Server 125 may be in data communication with the client applications 110, 115. For example, a server 125 may be in data communication with the client applications 110, 115 via one or more networks 120.

System 100 may include one or more databases 130. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the devices 112, 117 or the database 130 may be hosted externally to the devices 112, 117, such as by a server 125, by a cloud-based platform, or in any storage device that is in data communication with the devices 112, 117. In some examples, database 130 may be in data communication with any number of components of system 100. For example, server 125 may be configured to retrieve the requested data from the database 130 that is transmitted by applications 110, 115. Server 125 may be configured to transmit the received data from database 130 to client applications 110, 115 via network 120, the received data being responsive to the transmitted one or more requests. In other examples, client applications 110, 115 may be configured to transmit one or more requests for the requested data from database 130 via network 120.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the client devices 112, 117 and/or server 125 or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The application 110 may be configured to determine a capability associated with the transmitting device 105, such as a contactless card, after a first entry into a communication field. For example, the application 110 may be configured to determine if the transmitting device 105 includes an applet 106, such as a payment applet. In some examples, the application 110 of device 112 may be configured to read one or more messages from a tag, such as an NFC tag, from the transmitting device 105. For example, applet 106 may be configured to respond to one or more requests, such as near field data exchange requests, from a client device, including requests from a device 112 and/or device 117 having a reader such as a mobile device NFC reader. Applet 106 may be configured to read (or write) data from (or to) memory 104 and provide data in response to the one or more requests. In some examples, applet 106 may be configured to respond to near field data exchange format (NDEF) read commands and transmit data, such as the a tokenized link, according to NDEF format. In this manner, the tokenized link may be generated and transmitted by the transmitting device 105 upon a read, such as an NFC read, of a NFC tag, which may be created in accordance with NDEF. To the extent that the application 110 does not determine this capability, the application 110 may be configured to re-determine the capability associated with the transmitting device 105 up to and including a predetermined threshold number of read attempts before continuing. For example, the predetermined threshold number may be zero. In other examples, the predetermined threshold number may be one. In other examples, the predetermined threshold number may be greater than one. In some examples, the transmitting device 105 may enter the communication field of device 112 via one or more gestures, including but not limited to a tap, swipe, wave, and/or any combination thereof.

The application 110 may be configured to request additional information based on the determination of the capability. Without limitation, the additional information may comprise at least one selected from the group of insurance information, cardholder information, and email information. Without limitation, the insurance information may include at least one selected from the group of partial or full portions of a policy number, name, account information, insureds, and/or any combination thereof. Without limitation, the cardholder information may include at least one selected from the group of partial or full portions of an account number, credit card number, debit card number, card verification value, expiration date, and/or any combination thereof. Without limitation, the email information may include at least one selected from the group of email address, name, and/or any combination thereof. The application 110 may be configured to request insurance information, cardholder information, email information, and/or any combination thereof.

In some examples, the one or more applets 106 may be configured to transmit, to the application 110, a generated tokenized link after a second entry into the communication field based on the requested additional information. In some examples, the link may comprise a statically generated URL. In other examples, the link may comprise a dynamically generated URL. For example, the transmitting device 105 may be configured to generate a unique, limited use tokenized URL. In some examples, the limited use may comprise a one-time use. In other examples, the limited use may comprise a specified number of uses (e.g., two uses, ten uses), a specified time (e.g., a day, a month), and/or any combination thereof. In some examples, the link may comprise an encrypted one-time link.

The application 110 may be configured to transmit the link to obtain the requested additional information. In some examples, the server 125 may be configured to receive the link from the application 110 and obtain the requested additional information. In some examples, the server 125 may be configured to decrypt the encrypted one-time link.

In other examples, a device other than a POS device may be configured to read the contactless card. For example, devices with card readers, or card-reading capabilities may also be used via the systems and methods disclosed herein. In some examples, the device may not be limited to a POS device. As explained above, the device may comprise a mobile device. For example, device 112 may be configured to read one or more messages from a tag of transmitting device 105. In some examples, application 110 of device 112 may be configured to generate a tokenized link in order to retrieve the requested additional information. In some examples, the link may comprise a statically generated URL. In other examples, the link may comprise a dynamically generated URL. For example, application 110 of the first device 112 may be configured to generate a unique, limited use tokenized URL. In some examples, the limited use may comprise a one-time use. In other examples, the limited use may comprise a specified number of uses (e.g., two uses, ten uses), a specified time (e.g., a day, a month), and/or any combination thereof. In some examples, the link may comprise an encrypted one-time link. The link may be decrypted to obtain the requested additional information.

The application 110 of device 112 may be configured to authenticate information approved for sharing based on a permission level. For example, the permission level may comprise at least one selected from the group of a merchant type and a transaction type.

In some examples, the server 125 may be configured to authenticate information approved for sharing based on a permission level. For example, the permission level may comprise at least one selected from the group of a merchant type and transaction type. In some examples, the application 115 may be configured to control the permission level.

Server 125 may be configured to utilize cryptographic methods in order to verify the information it requests, receives, or otherwise has access to. For example, server 125 may be configured to receive information from application 110 and/or application 115, and this information may be signed with one or more keys (e.g., one or more public or private keys) and verified by one or more keys (e.g., one or more public or private keys). In one example, a server associated with an educational institution may be configured to sign with one or more keys, such as a private key, in order to confirm, for example, that a user attended a certain school or that a user possesses a certain degree. This information may be verified by a public key made available by the server associated with the educational institution. In another example, a server associated with a financial institution may be configured to sign with one or more keys, such as a private key, in order to confirm that a user possesses a predetermined credit score. This information may be verified by a public key made available by the server associated with the financial institution. In this manner, the requested information may be encrypted with the public key prior to transmission of the requested information, where the encrypted information is decrypted by the server using the private key.

The application 115 may be configured to update shareable information. For example, the application 115 may be configured to prompt one or more entries of the contactless card into the communication field of device 117 so as to save a setting associated with the updated shareable information. In some examples, the transmitting device 105 may be configured to transmit an updated data access link to the application 110 based on the updated shareable information, as further described in FIGS. 4-6.

Figure 2A:
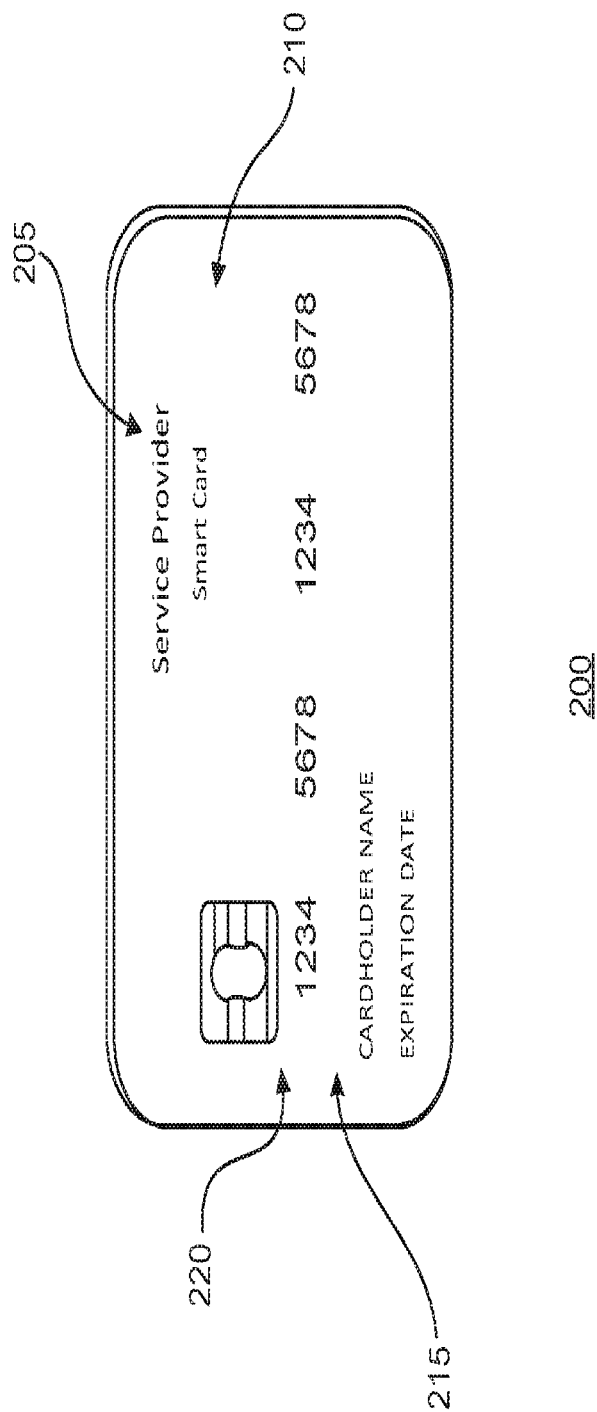
FIG. 2A is an illustration of a contactless card according to an exemplary embodiment.

FIG. 2A illustrates one or more transmitting device 200. Transmitting device 200 may reference or include same or similar components of transmitting device 105, such as contactless card, as explained above with respect to FIG. 1. Although FIGS. 2A and 2B illustrate single instances of components of transmitting device 200, any number of components may be utilized.

Transmitting device 200 may be configured to communicate with one or more components of system 100. Transmitting device 200 may comprise a contactless card or a contact-based card (e.g., a magnetic stripe card or a contact-based chip card). In some examples, the transmitting device 200 may comprise a payment card, such as a credit card, debit card, or gift card, issued by a service provider 205 displayed on the front or back of the transmitting device 200, such as a contactless card. In some examples, the transmitting device 200 is not related to a payment card, and may comprise, without limitation, an identification card. In some examples, the payment card may comprise a dual interface contactless payment card. The transmitting device 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transmitting device 200 may have physical characteristics compliant with the ID-1 format of the ISO/IEC 7810 standard, and the transmitting device may otherwise be compliant with the ISO/IEC 14443 standard. However, it is understood that the transmitting device 200 according to the present disclosure may have different characteristics, and the present disclosure does not require a contactless card to be implemented in a payment card.

The transmitting device 200 may also include identification information 215 displayed on the front and/or back of the transmitting device, and a contact pad 220. The contact pad 220 may be configured to establish contact with another communication device, including but not limited to a user device, smart phone, laptop, desktop, or tablet computer. The transmitting device 200 may also include processing circuitry, antenna and other components not shown in FIG. 2A. These components may be located behind the contact pad 220 or elsewhere on the substrate 210. The transmitting device 200 may also include a magnetic strip or tape, which may be located on the back of the card (not shown in FIG. 2A).

Figure 2B:
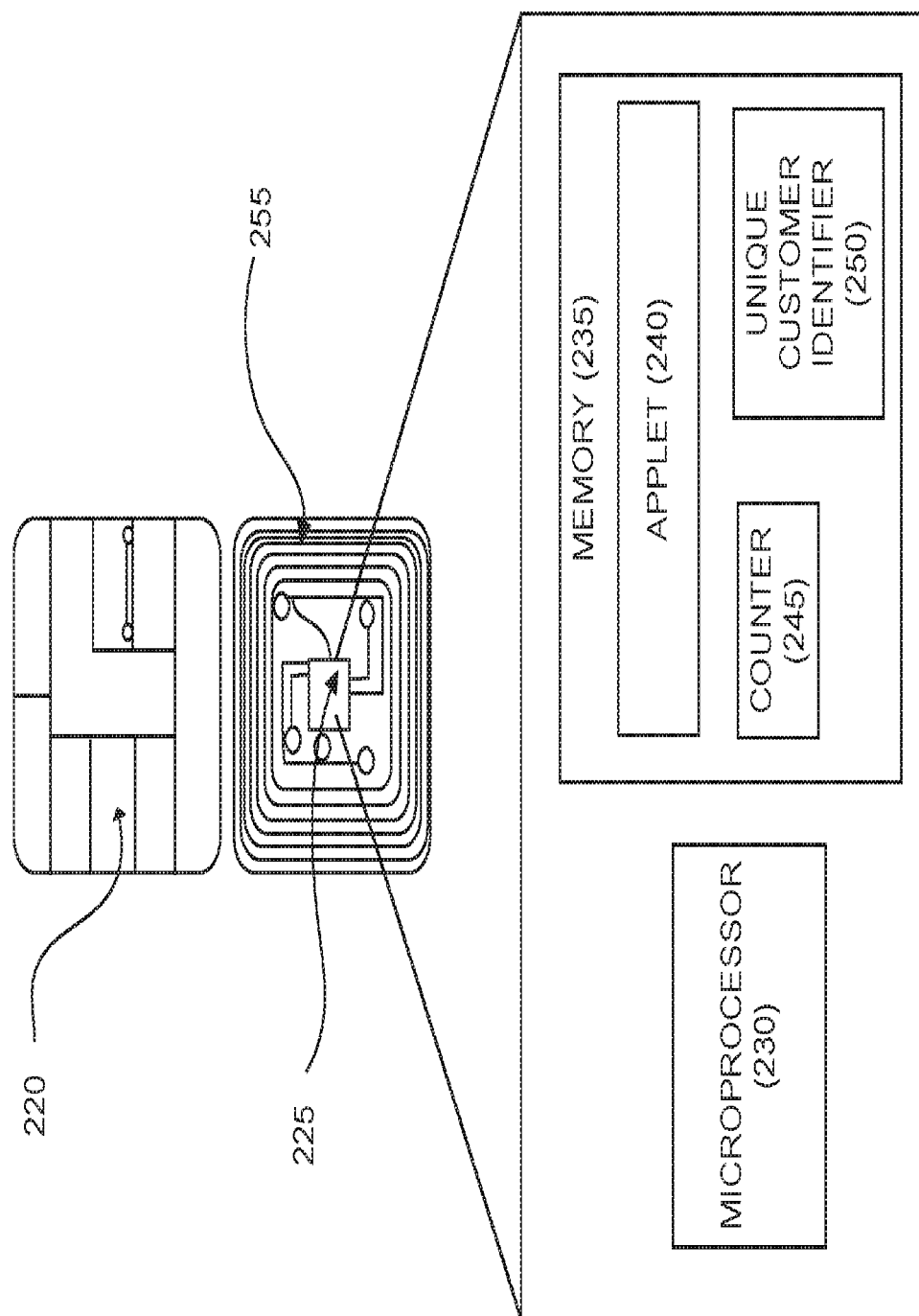
FIG. 2B is an illustration of a contact pad of the contactless card according to an exemplary embodiment.

As illustrated in FIG. 2B, the contact pad 220 of FIG. 2A may include processing circuitry 225 for storing and processing information, including a processor 230, such as a microprocessor, and a memory 235. It is understood that the processing circuitry 225 may contain additional components, including processors, memories, error and parity/CRC checkers, data encoders, anticollision algorithms, controllers, command decoders, security primitives and tamper-proofing hardware, as necessary to perform the functions described herein.

The memory 235 may be a read-only memory, write-once read-multiple memory or read/write memory, e.g., RAM, ROM, and EEPROM, and the transmitting device 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contactless cards, such as Java Card applet. However, it is understood that applets 240 are not limited to Java Card applets, and instead may be any software application operable on contactless cards or other devices having limited memory. The one or more counters 245 may comprise a numeric counter sufficient to store an integer. The customer identifier 250 may comprise a unique alphanumeric identifier assigned to a user of the transmitting device 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 220 or entirely separate from it, or as further elements in addition to processor 230 and memory 235 elements located within the contact pad 220.

In some examples, the transmitting device 200 may comprise one or more antennas 255. The one or more antennas 255 may be placed within the transmitting device 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of transmitting device 200 may act as the secondary of an air core transformer. The terminal may communicate with the transmitting device 200 by cutting power or amplitude modulation. The transmitting device 200 may infer the data transmitted from the terminal using the gaps in the contactless card's power connection, which may be functionally maintained through one or more capacitors. The transmitting device 200 may communicate back by switching a load on the contactless card's coil or load modulation. Load modulation may be detected in the terminal's coil through interference.

Figure 3:
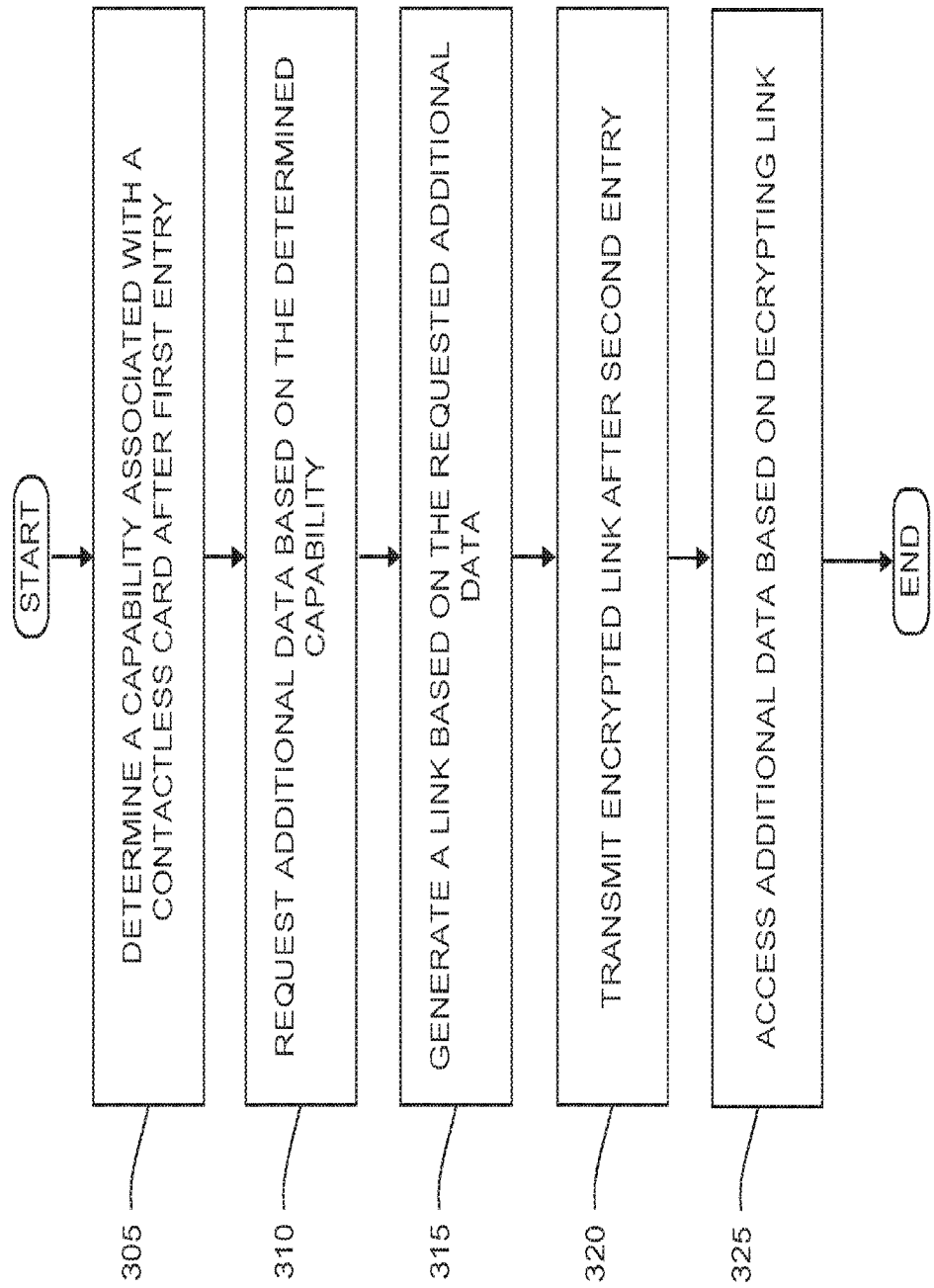
FIG. 3 depicts a method of authenticating shared data according to an exemplary embodiment.

FIG. 3 depicts a method 300 of authenticating shared data according to an exemplary embodiment. FIG. 3 may reference or include same or similar components of system 100 of FIG. 1, and transmitting device 200 of FIG. 2A and FIG. 2B.

At block 305, the method may include determining, by an application comprising instructions for execution on a client device, a capability associated with a transmitting device, such as a contactless card, after a first entry by the contactless card into a communication field of the device, including but not limited to a point of sales device. For example, the application may be configured to determine if the contactless card includes an applet, such as a payment applet. In some examples, the application of the device may be configured to read one or more messages from a tag, such as an NFC tag, from the contactless card. To the extent that the application does not determine this capability, the application may be configured to re-determine the capability associated with the transmitting device up to and including a predetermined threshold number of read attempts before indicating that the method may not continue. For example, the predetermined threshold number may be zero. In other examples, the predetermined threshold number may be one. In other examples, the predetermined threshold number may be greater than one. The contactless card may be configured to process a transaction, such as paying for one or more items at the point of sales device. In some examples, the contactless card may enter the communication field of the device via one or more gestures, including but not limited to a tap, swipe, wave, and/or any combination thereof.

At block 310, the method may include requesting, by the application, additional data based on the recognized capability of the transmitting device. For example, the additional data requested by the application of the point of sales device may be associated with a user of the transmitting device, such as the contactless card. In some examples, the additional data may comprise at least one selected from the group of personally identifiable data and cardholder data. Without limitation, the personally identifiable data may include one or more partial or full portions of a first name, a last name, a gender, an email address, a location, a phone number, social security number, health or medical information, financial asset information, non-financial asset information, educational information, date of birth information, home and billing address information, credit score information, social media information (including but not limited to friends, Facebook® posts and/or comments, Tweets®, LinkedIn® posts, Instagram® posts, connections, company pages, group pages), COVID-19 information (including but not limited to antibody status, contagious state, test history and results, recent test date), and/or any combination thereof. Without limitation, the cardholder data may include at least one selected from the group of partial or full portions of an account number, credit card number, debit card number, card verification value, expiration date, and/or any combination thereof. The application may be configured to request personally identifiable data, cardholder data, and/or any combination thereof.

At block 315, the method may include generating, by the contactless card, a link based on the requested data. For example, the contactless card may be configured to generate a link based on the additional data about the user requested by the application of the point of sales device. In some examples, the link may comprise a statically generated URL. In other examples, the link may comprise a dynamically generated URL. For example, the contactless card may be configured to generate a unique, limited use tokenized URL. In some examples, the limited use may comprise a one-time use. In other examples, the limited use may comprise a specified number of uses (e.g., two uses, ten uses), a specified time (e.g., a day, a month), and/or any combination thereof. As further explained in FIGS. 4-6, the method may further include updating, by the application, shareable data. In some examples, the method may further include requesting, by the application, one or more entries of the contactless card into the communication field so as to save a setting associated with the updated shareable data. In some examples, the method may further include transmitting, by the transmitting device, an updated data access link to the application of the point of sales device based on the updated shareable data. In some examples, the method may further include transmitting, by the application, an updated data access link to a server based on the updated shareable data.

At block 320, the method may include transmitting, after a second entry into the communication field, the link from a contactless card to the application of the device. In some examples, the second entry may occur via one or more gestures, including but not limited to a tap, swipe, wave, and/or any combination thereof. Thus, the link may be transmitted by the contactless card to the application after one or more additional entries into the communication field of the device. In some examples, the second entry may be one of the one or more additional entries of the transmitting device into the communication field of the point of sales device.

At block 325, the method may include transmitting, to a server, the link from the application for accessing the additional data. For example, the application of the point of sales device may be configured to transmit the link received from the transmitting device, such as the contactless card. The application of the point of sales device may be configured to transmit the link to a server for accessing the additional data. The method may further include authenticating, by the server, data approved for sharing based on one or more permission levels. In some examples, the permission level may comprise at least one selected from the group of a merchant type and transaction type.

For example, the server may authorize access of the additional data based on performing a comparison to determine a successful match with an identifier associated with a merchant type and/or approved merchant type. In another example, the server may authorize access of the additional data based on performing a comparison to determine a successful match with an identifier associated with a transaction type and/or approved transaction type. The merchant type may be of the type previously authorized or used for any number of merchants within a predetermined time, including but not limited to a day, time, week, month, and/or any combination thereof. The merchant type may be associated with a restaurant, financial institution, store, governmental entity, non-governmental entity, school, and/or any combination thereof. The transaction type may be of the type previously authorized or used for any number of transactions within a predetermined time, including but not limited to a day, time, week, month, and/or any combination thereof. The transaction type may be associated with a credit card transaction, a debit card transaction, an online payment, and/or any combination thereof. In some examples, the permission level may include at least one selected from the group of a merchant type, a transaction type, and/or any combination thereof.

In some examples, the server may be configured to transmit one or more requests to a database for accessing the additional data and conducting the comparisons based on the one or more permission levels. To the extent the comparison yields an unsuccessful match, the server and/or database may be configured to transmit one or more notifications to the application of the point of sales device indicating that the access to the additional data is prohibited based on the unsuccessful comparison, accounting for the one or more permission levels. To the extent the comparison yields a successful match, the server and/or database may be configured to transmit one or more notifications to the application of the point of sales device indicating that the access to the additional data is permitted based on the successful comparison, accounting for the one or more permission levels. In this manner, partial or full portions of the additional data may be authenticated for sharing.

Figure 4:
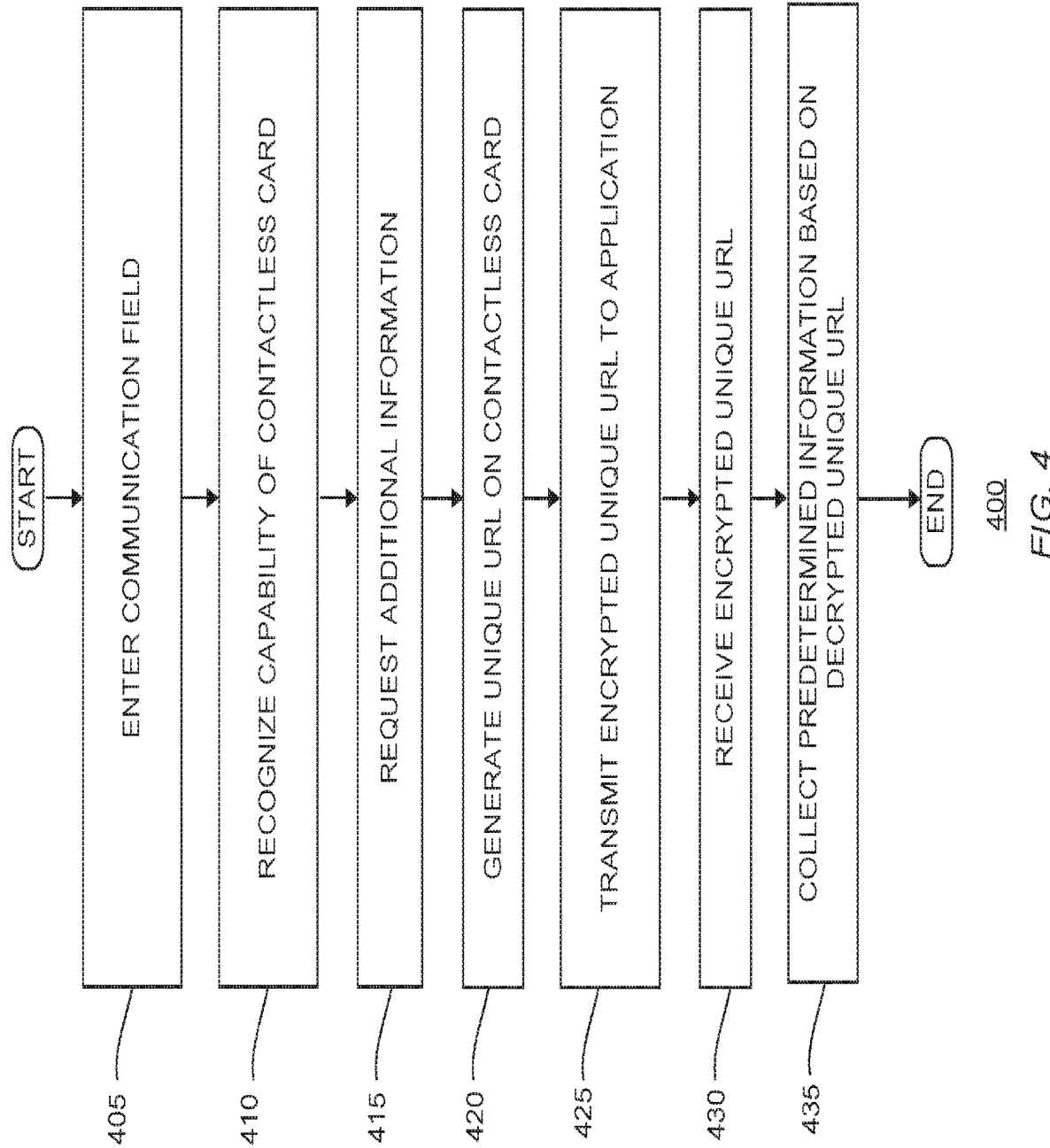
FIG. 4 depicts a method transmitting predetermined information according to an exemplary embodiment.

FIG. 4 depicts a method 400 of transmitting predetermined information to an application comprising instructions for execution on a device according to an exemplary embodiment. FIG. 4 may reference or include same or similar components of system 100, transmitting device 200 of FIG. 2A and FIG. 2B, method 300 of FIG. 3, method 500 of FIG. 5, and method 600 of FIG. 6.

FIG. 4 depicts a method 400 of transmitting predetermined information to an application comprising instructions for execution on a device. As previously explained above, the device may comprise a POS system, kiosk, or terminal. The predetermined information may comprise one or more partial or full portions of a first name, a last name, a gender, an email address, a location, a phone number, social security number, health or medical information, financial asset information, non-financial asset information, educational information, date of birth information, home and billing address information, credit score information, social media information (including but not limited to friends, Facebook® posts and/or comments, Tweets®, LinkedIn® posts, Instagram® posts, connections, company pages, group pages), COVID-19 information (including but not limited to antibody status, contagious state, test history and results, recent test date), and/or any combination thereof. In some examples, the predetermined information may be transmitted on a global basis, such as by default for all merchants. In other examples, the predetermined information may be transmitted on a non-global basis, such as a merchant-by-merchant basis. For example, the predetermined information may be transmitted to one or more merchants based on a merchant category, a transaction associated with a merchant, a geographic location, and/or any combination thereof.

At block 405, the method 400 may include the contactless card entering a communication field of the device. In some examples, the contactless card may enter the communication field via one or more gestures, including but not limited to a tap, swipe, wave, and/or any combination thereof.

At block 410, the method 400 may include recognizing a capability of the contactless card. For example, the application may be configured to determine if the contactless card includes an applet, such as a payment applet. In some examples, the application of the device may be configured to read one or more messages from a tag, such as an NFC tag, from the contactless card. To the extent that the application does not determine this capability, the application may be configured to re-determine the capability associated with the transmitting device up to and including a predetermined threshold number of read attempts before continuing. For example, the predetermined threshold number may be zero. In other examples, the predetermined threshold number may be one. In other examples, the predetermined threshold number may be greater than one. In some examples, the contactless card may enter the communication field of the device via one or more gestures, including but not limited to a tap, swipe, wave, and/or any combination thereof.

At block 415, the method 400 may include requesting additional information about the user. For example, the additional information requested by the application of the device may be associated with a user of the transmitting device, such as the contactless card. For example, the application of the device may be configured to request additional information. Without limitation, the additional information may include one or more partial or full portions of a first name, a last name, a gender, an email address, a location, a phone number, social security number, health or medical information, financial asset information, non-financial asset information, educational information, date of birth information, home and billing address information, credit score information, social media information (including but not limited to friends, Facebook® posts and/or comments, Tweets®, LinkedIn® posts, Instagram® posts, connections, company pages, group pages), COVID-19 information (including but not limited to antibody status, contagious state, test history and results, recent test date), and/or any combination thereof.

At block 420, the method 400 may include generating a unique URL. For example, the contactless card may be configured to generate a unique, limited use tokenized URL based on the predetermined information and additional information. In some examples, the limited use may comprise a one-time use. In other examples, the limited use may comprise a specified number of uses (e.g., two uses, ten uses), a specified time (e.g., a day, a month), and/or any combination thereof. In some examples, the URL may comprise a statically generated URL. In other examples, the URL may comprise a dynamically generated URL. In some examples, the URL may comprise an encrypted one-time URL.

At block 425, the method 400 may include transmitting the unique URL to the application. For example, the contactless card may be configured to transmit the unique, limited use tokenized URL to the application of the device. The application of the device may be configured to receive the unique URL from the transmitting device. In some examples, the application of the device may be configured to decrypt the one-time URL.

At block 430, the method 400 may include transmitting the unique URL to a server. For example, the application of the device may be configured to transmit the unique, limited use tokenized URL to a server. The server may be configured to receive the unique URL from the application of the device.

At block 435, the method 400 may include accessing the unique URL. For example, the server may be configured to access the unique, limited use tokenized URL and collect the requested information. In some examples, the server may be configured to decrypt the encrypted one-time URL. The requested information may comprise one or more partial or full portions of the predetermined information. The method may further include authenticating, by the server, information approved for sharing based on one or more permission levels. In some examples, the permission level may comprise at least one selected from the group of a merchant type and transaction type.

For example, the server may authorize access of the additional information based on performing a comparison to determine a successful match with an identifier associated with a merchant type and/or approved merchant type. In another example, the server may authorize access of the additional data based on performing a comparison to determine a successful match with an identifier associated with a transaction type and/or approved transaction type. The merchant type may be of the type previously authorized or used transaction for any number of merchants within a predetermined time, including but not limited to a day, time, week, month, and/or any combination thereof. The merchant type may be associated with a restaurant, financial institution, store, governmental entity, non-governmental entity, school, and/or any combination thereof. The transaction type may be of the type previously authorized or used for any number of transactions within a predetermined time, including but not limited to a day, time, week, month, and/or any combination thereof. The transaction type may be associated with a credit card transaction, a debit card transaction, an online payment, and/or any combination thereof. In some examples, the permission level may include at least one selected from the group of a merchant type, a transaction type, and/or any combination thereof.

In some examples, the server may be configured to transmit one or more requests to a database for accessing the additional information and conducting the comparisons based on the one or more permission levels. To the extent the comparison yields an unsuccessful match, the server and/or database may be configured to transmit one or more notifications to the application of the point of sales device indicating that the access to the additional information is prohibited based on the unsuccessful comparison, accounting for the one or more permission levels. To the extent the comparison yields a successful match, the server and/or database may be configured to transmit one or more notifications to the application of the point of sales device indicating that the access to the additional information is permitted based on the successful comparison, accounting for the one or more permission levels. In this manner, partial or full portions of the additional information may be authenticated for sharing.

Figure 5:
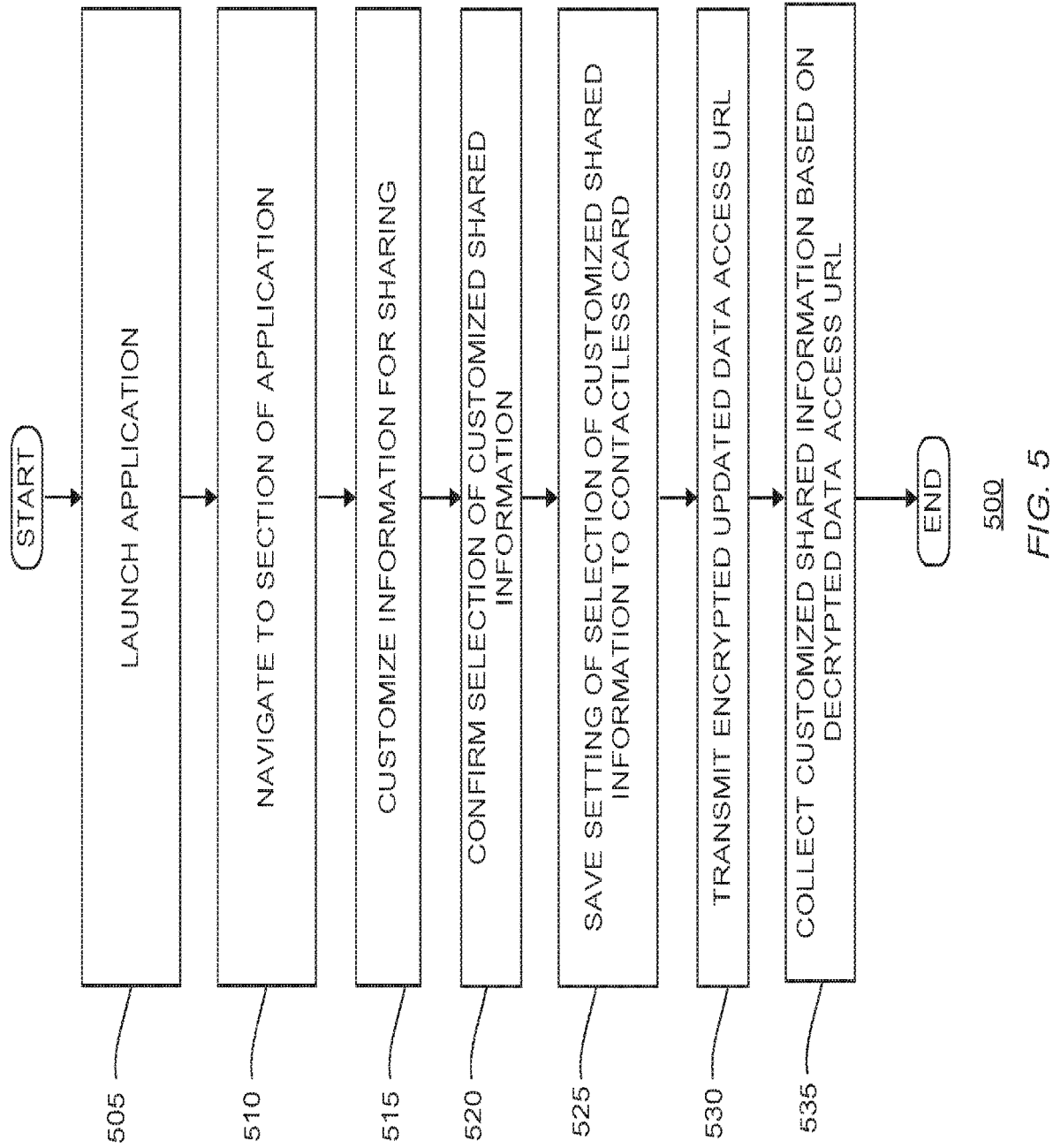
FIG. 5 depicts a method of updating shareable information according to an exemplary embodiment.

FIG. 5 illustrates a method 500 of updating shareable information according to an exemplary embodiment. FIG. 5 may reference or include same or similar components of system 100, transmitting device 200 of FIG. 2A and FIG. 2B, method 300 of FIG. 3, method 400 of FIG. 4, and method 600 of FIG. 6.

At block 505, the method 500 may include launching an application. For example, the application may comprise instructions for execution on a device. In some examples, the application may request input of one or more login credentials for user verification. As previously explained, the device may comprise a client device.

At block 510, the method 500 may include navigating to a section within the application of the client device. For example, the application of the client device may comprise one or more sections. The application may be configured to provide a data sharing implementation to provide a controlled distribution of information, including but not limited to personally identifiable information and/or any other sensitive information. The one or more sections of the application of the client device may comprise a data management section. The user may navigate to the data management section of the application. For example, the data management section may provide one or more selectable parameters including but not limited to one or more partial or full portions of a first name, a last name, a gender, an email address, a location, a phone number, social security number, health or medical information, financial asset information, non-financial asset information, educational information, date of birth information, home and billing address information, credit score information, social media information (including but not limited to friends, Facebook® posts and/or comments, Tweets®, LinkedIn® posts, Instagram® posts, connections, company pages, group pages), COVID-19 information (including but not limited to antibody status, contagious state, test history and results, recent test date), and/or any combination thereof.

At block 515, the method 500 may include customizing information for sharing. For example, the user may, within the data management section of the application of the client device, control what type of information is shared and/or to whom to share the information to, including but not limited to merchants. In some examples, the customization may include sharing any information, such as the information in block 510, to one or more merchants based on the one or more selectable parameters. In some examples, the customization may include sharing information by one or more merchant categories via the data management section of the application of the client device. In some examples, the shared information may be customized for transmission on a global basis, such as by default for all merchants. In other examples, the information may be customized for sharing by the application of the client device for transmission on a non-global basis, such as a merchant-by-merchant basis. In some examples, the customization may include sharing information to device, such as a point-of-sale device or application comprising instructions for execution thereon. For example, the information may be specific to a particular merchant and/or one or more merchant categories, such that the data management section of the application is configured to share this type of information. For example, the shared information may be transmitted to one or more merchants based on a merchant category, a transaction associated with a merchant, a geographic location, and/or any combination thereof. In one example, an application comprising instructions on a device associated with a merchant, such as a grocery store, may be configured to receive only email address information to transmit one or more redeemable coupons. In another example, a device comprising instructions on a device associated with a different merchant, such as a hospital or doctor's office, may be configured to receive additional information and/or different information, such as personally identifiable information, including but not limited to social security number information, date of birth information, insurance information, address information, medical information, and/or any combination thereof. Under either of these non-limiting examples, the sharing of the specific information may be based on the customization via the data management section of the application.

At block 520, the method 500 may include confirming the customized information for sharing. For example, the application of the device may be configured to prompt the user to confirm which information may be shared to one or more merchants and/or be based on one or more merchant categories.

At block 525, the method 500 may include saving the desired setting of customizing the scope of the shared information based on the confirmation prompt. For example, the application of the device may be configured to prompt one or more entries of the contactless card into the communication field of the device in order to save the setting to the contactless card.

At block 530, the method 500 may include transmitting an updated data access URL. For example, the contactless card may be configured to transmit the updated data access URL to an application of a device, including but not limited to an application of a POS system, a kiosk, or terminal. The contactless card may be configured to generate the updated data access unique URL. For example, the contactless card may be configured to generate a unique, updated data access limited use tokenized URL. In some examples, the limited use may comprise a one-time use. In other examples, the limited use may comprise a specified number of uses (e.g., two uses, ten uses), a specified time (e.g., a day, a month), and/or any combination thereof. In some examples, the URL may comprise a statically generated URL. In other examples, the URL may comprise a dynamically generated URL. The URL may comprise an encrypted data access URL. In some examples, the method 500 may include transmitting the updated data access URL to a server. In some examples, the application of the POS system, a kiosk, or terminal may be configured to transmit the encrypted updated data access URL to one or more servers so as to retrieve the information based on the saved setting.

At block 535, the method 500 may include receiving the updated data access URL. For example, the server may be configured to decrypt the encrypted updated data access URL to identify the shared information. In some examples, one or more partial or full portions of the shared information may be associated with the updated data access URL. Thus, the server may be configured to grant access and/or collect the shared information based on the updated data access URL associated with the saved setting from the data management section of the application. The method may further include authenticating, by the server, information approved for sharing based on the updated data access URL and/or one or more permission levels. In some examples, the permission level may comprise at least one selected from the group of a merchant type and transaction type.

For example, the server may authorize access of the shared information and/or updated data access based on performing a comparison to determine a successful match with an identifier associated with a merchant type and/or approved merchant type. In another example, the server may authorize access of the shared information and/or updated data access based on performing a comparison to determine a successful match with an identifier associated with a transaction type and/or approved transaction type. The merchant type may be of the type previously authorized or used transaction for any number of merchants within a predetermined time, including but not limited to a day, time, week, month, and/or any combination thereof. The merchant type may be associated with a restaurant, financial institution, store, governmental entity, non-governmental entity, school, and/or any combination thereof. The transaction type may be of the type previously authorized or used for any number of transactions within a predetermined time, including but not limited to a day, time, week, month, and/or any combination thereof. The transaction type may be associated with a credit card transaction, a debit card transaction, an online payment, and/or any combination thereof. In some examples, the permission level may include at least one selected from the group of a merchant type, a transaction type, and/or any combination thereof.

In some examples, the server may be configured to transmit one or more requests to a database for accessing the shared information and/or updated data access and conducting the comparisons based on the one or more permission levels. To the extent the comparison yields an unsuccessful match, the server and/or database may be configured to transmit one or more notifications to the application of the point of sales device indicating that the access to the shared information and/or updated data access is prohibited based on the unsuccessful comparison, accounting for the one or more permission levels. To the extent the comparison yields a successful match, the server and/or database may be configured to transmit one or more notifications to the application of the point of sales device indicating that the access to the shared information and/or updated data access is permitted based on the successful comparison, accounting for the one or more permission levels. In this manner, partial or full portions of the shared information and/or updated data access may be authenticated for sharing.

Figure 6:
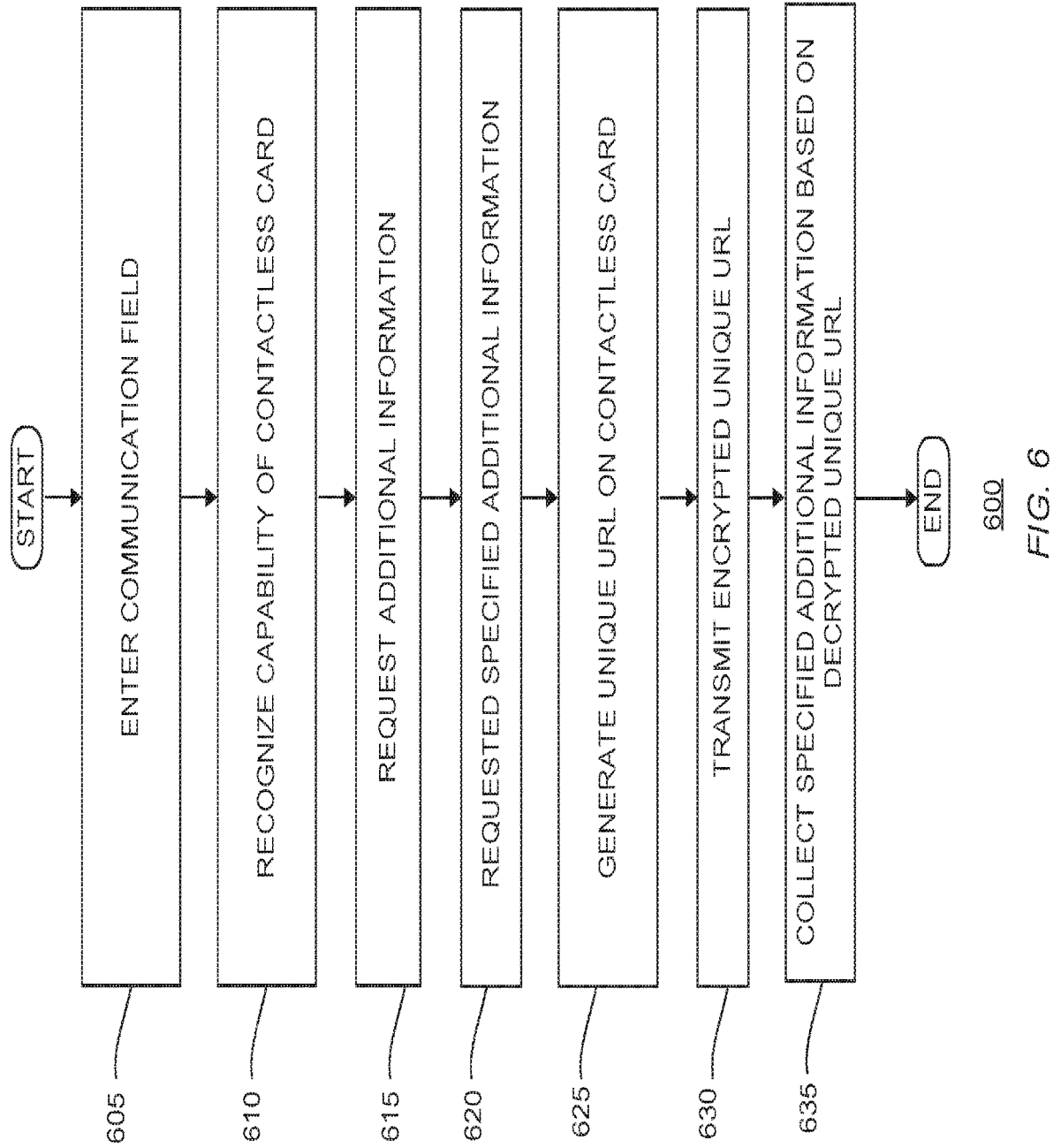
FIG. 6 depicts a method of transmitting specific information for a given transaction according to an exemplary embodiment.

FIG. 6 illustrates a method 600 of transmitting specific information to an application for a given transaction according to an exemplary embodiment. As explained below, the method 600 may incorporate an additional user consent input requirement into what information to transmit and/or receive, and make available. FIG. 6 may reference or include same or similar components of system 100, transmitting device 200 of FIG. 2A and FIG. 2B, method 300 of FIG. 3, method 400 of FIG. 4, and method 500 of FIG. 5.

At block 605, the method 600 may include the contactless card entering a communication field of a device. In some examples, the contactless card may enter the communication field via one or more gestures, including but not limited to a tap, swipe, wave, and/or any combination thereof. As previously explained, the device may include, without limitation, a POS system, a kiosk, or a terminal.

At block 610, the method 600 may include recognizing a capability of the contactless card. For example, the application of the device may be configured to determine if the contactless card includes an applet, such as a payment applet. In some examples, the application of the device may be configured to read one or more messages from a tag, such as an NFC tag, from the contactless card. To the extent that the application of the device does not determine this capability of the transmitting device, the application of the device may be configured to re-determine the capability up to and including a predetermined threshold number of attempts before continuing. For example, the predetermined threshold number may be zero. In other examples, the predetermined threshold number may be one. In other examples, the predetermined threshold number may be greater than one. In some examples, the contactless card may enter the communication field of the device via one or more gestures, including but not limited to a tap, swipe, wave, and/or any combination thereof.

At block 615, the method 600 may include requesting additional information about the user of the transmitting device. For example, the request additional information may be received by the application of the device. The application of the device may be configured to prompt what information to transmit. The application may submit the additional information that is responsive to the requested additional information. The additional information may comprise one or more partial or full portions of a first name, a last name, a gender, an email address, a location, a phone number, social security number, health or medical information, financial asset information, non-financial asset information, educational information, date of birth information, home and billing address information, credit score information, social media information (including but not limited to friends, Facebook® posts and/or comments, Tweets®, LinkedIn® posts, Instagram® posts, connections, company pages, group pages), COVID-19 information (including but not limited to antibody status, contagious state, test history and results, recent test date), and/or any combination thereof. In some examples, the additional information may be transmitted on a global basis, such as by default for all merchants. In other examples, the additional information may be transmitted on a non-global basis, such as a merchant-by-merchant basis. For example, the predetermined information may be transmitted to one or more merchants based on a merchant category, a transaction associated with a merchant, a geographic location, and/or any combination thereof.

At block 620, the method 600 may include requesting specified additional information. In some examples, the specified additional information may request consent from the user. For example, the application of the device may be configured to inform the user of a portion of personally identifiable information, such as presenting a redacted or partial email address, that has been recognized as a match and associated with the user. In addition, the application may be configured to prompt the user to confirm this portion of personally identifiable information, update this portion of personally identifiable information, and/or remove this portion of personally identifiable information. Upon a selection responsive to the prompt, the application of the device may be configured to inform the user to select input of one or more additional parameters for consent. For example, the one or more additional parameters may include a consent parameter. Without limitation, the consent parameter may comprise consenting to signing up and/or receiving one or more notifications associated with receiving emails, receiving mail, receiving alerts, and/or any combination thereof.

At block 625, the method 600 may include generating a unique URL. For example, the contactless card may be configured to generate unique, limited use tokenized URL. In some examples, the URL may comprise a statically generated URL. In other examples, the URL may comprise a dynamically generated URL. In some examples, the limited use may comprise a one-time use. In other examples, the limited use may comprise a specified number of uses (e.g., two uses, ten uses), a specified time (e.g., a day, a month), and/or any combination thereof. In some examples, the link may comprise an encrypted one-time URL.

At block 630, the method 600 may include transmitting the unique URL to the application. For example, the contactless card may be configured to transmit the unique, limited use tokenized URL to the application of the device. For example, the contactless card may be configured to transmit the unique, limited use tokenized URL to the application of the device. The application of the device may be configured to receive the unique, limited use tokenized URL from the transmitting device. In some examples, the application of the device may be configured to decrypt the one-time URL. In some examples, the method 600 may include transmitting the unique URL to a server. For example, the application of the device may be configured to transmit the unique, limited use tokenized URL to a server. For example, the server may be configured to receive the unique, limited use tokenized URL from the application of the device.

At block 635, the method 600 may include accessing the unique URL. For example, the server may be configured to receive and access the unique, limited use tokenized URL and collect the requested information and the specified additional information. In some examples, the server may be configured to decrypt the encrypted one-time URL. For example, the server may be configured to access the unique, limited use tokenized URL and collect the requested information. In some examples, the server may be configured to decrypt the encrypted one-time URL. The requested information may comprise one or more partial or full portions of the additional information. The method may further include authenticating, by the server, the requested information based on one or more permission levels. In some examples, the permission level may comprise at least one selected from the group of a merchant type and transaction type.

For example, the server may authorize access of the requested information based on performing a comparison to determine a successful match with an identifier associated with a merchant type and/or approved merchant type. In another example, the server may authorize access of the requested information based on performing a comparison to determine a successful match with an identifier associated with a transaction type and/or approved transaction type. The merchant type may be of the type previously authorized or used transaction for any number of merchants within a predetermined time, including but not limited to a day, time, week, month, and/or any combination thereof. The merchant type may be associated with a restaurant, financial institution, store, governmental entity, non-governmental entity, school, and/or any combination thereof. The transaction type may be of the type previously authorized or used for any number of transactions within a predetermined time, including but not limited to a day, time, week, month, and/or any combination thereof. The transaction type may be associated with a credit card transaction, a debit card transaction, an online payment, and/or any combination thereof. In some examples, the permission level may include at least one selected from the group of a merchant type, a transaction type, and/or any combination thereof.

In some examples, the server may be configured to transmit one or more requests to a database for accessing the additional information and conducting the comparisons based on the one or more permission levels. To the extent the comparison yields an unsuccessful match, the server and/or database may be configured to transmit one or more notifications to the application of the point of sales device indicating that the access to the additional information is prohibited based on the unsuccessful comparison, accounting for the one or more permission levels. To the extent the comparison yields a successful match, the server and/or database may be configured to transmit one or more notifications to the application of the point of sales device indicating that the access to the additional information is permitted based on the successful comparison, accounting for the one or more permission levels. In this manner, partial or full portions of the additional information may be authenticated for sharing.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A contactless card, comprising:
a processor; and
a memory,
wherein the contactless card is associated with a capability, and
wherein the processor is configured to:
receive, following a first entry of the contactless card into a communication field, a request for additional information,
generate, based on the additional information, a tokenized link, and
transmit the tokenized link to an application associated with a device.

2. The contactless card of claim 1, wherein the additional information comprises at least one selected from the group of insurance information, cardholder information, and email information.

3. The contactless card of claim 1, wherein the tokenized link comprises a limited use uniform resource locator (URL).

4. The contactless card of claim 3, wherein the limited use URL is limited to a one-time use.

5. The contactless card of claim 3, wherein the limited use URL is limited to a specified number of uses within a specified time.

6. The contactless card of claim 1, wherein the tokenized link comprises a dynamically generated uniform resource locator (URL).

7. The contactless card of claim 1, wherein the tokenized link comprises an encrypted one-time link.

8. A data sharing system, comprising:
a processor;
an application comprising instructions for execution on the processor,
wherein, after entry of a contactless card into a communication field, the application is configured to:
determine a capability associated with the contactless card,
request, from the contactless card, additional information based on the determination,
receive, from the contactless card after a second entry into the communication field, a tokenized link, and
transmit the tokenized link to obtain the additional information.

9. The data sharing system of claim 8, wherein:
the system further comprises a server, and
the server is configured to authenticate information approved for sharing based on a permission level.

10. The data sharing system of claim 9, wherein the permission level comprises at least one selected from the group of a merchant type and transaction type.

11. The data sharing system of claim 9, wherein the application is further configured to control the permission level.

12. The data sharing system of claim 9, wherein the server is further configured to receive the tokenized link and obtain the additional information.

13. The data sharing system of claim 9, wherein the tokenized link is generated based on the additional information.

14. The data sharing system of claim 9, wherein the tokenized link is limited to a specified number of uses within a specified time.

15. The data sharing system of claim 9, wherein the application is further configured to:
update shareable information,
request an additional entry of the contactless card into the communication field, and
save a setting associated with the updated shareable information.

16. The data sharing system of claim 15, wherein:
the system further comprises a server, and
the application is configured to transmit an updated link to the server based on the updated shareable information.

17. A computer readable non-transitory medium comprising computer-executable instructions that are executed on a processor and comprise the steps of:
determining a capability associated with a contactless card;
requesting, from the contactless card, additional information based on the determination;
receiving, from the contactless card after a second entry into the communication field, a tokenized link; and
transmitting the tokenized link to obtain the additional information.

18. The computer readable non-transitory medium of claim 17, wherein the tokenized link comprises a dynamically generated uniform resource locator (URL).

19. The computer readable non-transitory medium of claim 18, wherein the tokenized link is limited to a specified number of uses within a specified time.

20. The computer readable non-transitory medium of claim 17, further comprising the step of re-determining the capability up to a threshold number of read attempts the contactless card prior to requesting the additional information.

* * * * *